(12) United States Patent
Yamamoto et al.

(10) Patent No.: US 7,970,998 B2
(45) Date of Patent: Jun. 28, 2011

(54) PARALLEL CACHES OPERATING IN EXCLUSIVE ADDRESS RANGES

(75) Inventors: Takao Yamamoto, Osaka (JP); Tetsuya Tanaka, Kyoto (JP); Ryuta Nakanishi, Kyoto (JP); Masaitsu Nakajima, Osaka (JP); Keisuke Kaneko, Kyoto (JP); Hazuki Okabayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 610 days.

(21) Appl. No.: 11/910,831

(22) PCT Filed: Mar. 17, 2006

(86) PCT No.: PCT/JP2006/305389
§ 371 (c)(1),
(2), (4) Date: Oct. 5, 2007

(87) PCT Pub. No.: WO2006/109421
PCT Pub. Date: Oct. 19, 2006

(65) Prior Publication Data
US 2009/0077318 A1 Mar. 19, 2009

(30) Foreign Application Priority Data
Apr. 8, 2005 (JP) .................... 2005-112840

(51) Int. Cl.
*G06F 12/08* (2006.01)
(52) U.S. Cl. .................. 711/120; 711/E12.017; 711/3
(58) Field of Classification Search .............. 711/119, 711/120, 128, 3, E12.017
See application file for complete search history.

(56) References Cited

U.S. PATENT DOCUMENTS

| | | | |
|---|---|---|---|
| 5,257,359 A | | 10/1993 | Blasco et al. |
| 5,261,066 A | | 11/1993 | Jouppi et al. |
| 5,317,718 A | * | 5/1994 | Jouppi .......................... 711/137 |
| 5,822,757 A | | 10/1998 | Chi |
| 5,870,599 A | * | 2/1999 | Hinton et al. ................. 712/239 |
| 6,219,760 B1 | * | 4/2001 | McMinn ....................... 711/137 |
| 6,418,525 B1 | * | 7/2002 | Charney et al. ............... 711/213 |
| 2005/0044320 A1 | * | 2/2005 | Olukotun ...................... 711/118 |
| 2005/0080986 A1 | * | 4/2005 | Park ............................ 711/103 |
| 2005/0257011 A1 | | 11/2005 | Kondoh et al. |
| 2007/0136530 A1 | | 6/2007 | Tanaka |

FOREIGN PATENT DOCUMENTS

| | | |
|---|---|---|
| EP | 0382396 | 8/1990 |
| EP | 0496439 | 7/1992 |
| JP | 2 81241 | 3/1990 |
| JP | 2 236651 | 9/1990 |
| JP | 4 303248 | 10/1992 |
| JP | 6 348593 | 12/1994 |
| JP | 9 204356 | 8/1997 |
| JP | 10 207773 | 8/1998 |
| JP | 2000 148584 | 5/2000 |
| JP | 2001 256107 | 9/2001 |
| WO | 2004 031963 | 4/2004 |

OTHER PUBLICATIONS

English Language Abstract of JP 4-303248.

(Continued)

*Primary Examiner* — Shane M Thomas
(74) *Attorney, Agent, or Firm* — Greenblum & Bernstein, P.L.C.

(57) ABSTRACT

A cache memory of the present invention includes a second cache memory that is operated in parallel with a first cache memory, a judgment unit which, when a cache miss occurs in both of the first cache memory and the second cache memory, makes a true or false judgment relating to an attribute of data for which memory access resulted in the cache miss, and a controlling unit which stores memory data in the second cache memory when a judgment of true is made, and stores the memory data in the first cache memory when a judgment of false is made.

14 Claims, 7 Drawing Sheets

OTHER PUBLICATIONS

English Language Abstract of JP 2-81241.
English Language Abstract of JP 2-236651.
English Language Abstract of JP 2001-256107.
English Language Abstract of JP 2000-148584.
English Language Abstract of JP 10-207773.
English Language Abstract of JP 9-204356.
English Language Abstract of JP 6-348593.
Jouppi, "Improving Direct-Mapped Cache Performance by the Addition of a Small Fully-Associative Cache and Prefetch Buffers", Proc. 17th Annual International Symposium on Computer Architecture, pp. 364-373, IEEE (1990).

* cited by examiner

```
Line1:ADR_TER1    equ    0xD0190030           //address of TER1
Line2:DAT_TER1    equ    0x90002205           // BA = 0x90002
Line3:                                        // PS = 10(128kbyte)
Line4:                                        // SC = 1 (sub cache)
Line5:                                        // V = on
Line6:            mov    r28, ADR_TER1
Line7:            mov    r29, DAT_TER1        //set to TER1
Line8:            st     (r28),r29
    ---
```

PARALLEL CACHES OPERATING IN EXCLUSIVE ADDRESS RANGES

TECHNICAL FIELD

The present invention relates to a cache memory for speeding up access to a memory by a processor.

BACKGROUND ART

For example, a victim cache is disclosed in a patent reference 1 and a non-patent reference 1 as a technique for reducing cache misses.

FIG. 1 is a block diagram that shows a system example containing a victim cache in conventional technology. The system in the said diagram has a CPU 501, a cache memory 502, and a full associative type victim cache 503. The victim cache 503 has at least one entry that contains a tag address and line data.

When a cache miss occurs in the cache memory 502 and the victim cache 503, an oldest entry is selected in the cache memory 502 as a subject for replacement through LRU (Least Recently Used). Before the selected entry is replaced, contents of the concerned entry are transferred from the cache memory 502 to the victim cache 503. By doing so, entries in the victim cache 503 are updated. And after this, the selected entry in the cache memory 502 is replaced.

As a result, the victim cache 503 always holds at least a piece of line data that is discarded last time from the cache memory 502.

By doing so, when the CPU 501 accesses the data that is discarded from the cache memory 502 again, it is highly possible to hit it in the victim cache 503, which reduces penalties occurred by a cache miss.

Especially, for a case of accessing data closed in an extremely small area, which has an extremely strong temporal locality (a characteristic that accessed data tends to be accessed in the near future), is accessed intensively in an extremely short period of time, also has a strong spatial locality (a characteristic that adjacent data of accessed data tends to be accessed in the near future), the data originally held is likely to be held in the victim cache 503 while the data is being accessed so that it is highly effective to reduce penalties through a cache miss Patent Reference 1: U.S. Pat. No. 5,261,066 Specification Non-Patent Reference 1: Jouppi, N. P. [1990], "Improving direct-mapped cache performance by the addition of a small fully-associative cache and prefetch buffers, "Proc. 17th Annual Int'l Symposium on Computer Architecture, 364-73

DISCLOSURE OF INVENTION

Problems That Invention is to Solve

However, according to the conventional technology mentioned above, for example, if a series of data that have a strong spatial locality but have a weak temporal locality are accessed in order, there is a problem that many cache misses occur and a usage efficiency of the cache memory is degraded. The data having a strong spatial locality but a weak temporal locality means to be, for example, array data of coefficients for a filter in a digital signal process, which is data accessed in order by the CPU.

Under a situation where the array data is bigger than a capacity of the cache entries, or under a situation where there are a plural number of array data, if the CPU accesses the plural number of array data in order, it means it replaces a plural number of entries in the cache memory for holding the array data.

As a result of that, on one hand, it improves a hit ratio of the array data because a part or a major part of entries in the cache memory is occupied by the array data and the data originally held in the cache memory is discarded. However, on the other hand, it causes a problem that a hit ratio of the originally held data falls down. In this case, there is a penalty that the cache entry is replaced for holding the originally held data in the cache again, and it decreases usage efficiency of the cache memory.

An object of the present invention is to provide a cache memory that: improves a memory accessing efficiency not only for data which has a strong temporal locality and high demand over an extremely short period of time, and which also has a strong spatial locality and is closed in an extremely small area, but also data which has a strong spatial locality and a weak temporal locality; and, in addition, improves usage efficiency of the entire cache memory.

Means to Solve the Problems

In order to achieve the above object, the cache memory according to the present invention is a cache memory including: a first cache memory, a second cache memory that is operated in parallel with the first cache memory, a judgment unit which, when a cache miss occurs in both of the first cache memory and the second cache memory, makes a true or false judgment relating to an attribute of data for which memory access resulted in the cache miss, and a controlling unit which stores memory data in the second cache memory when a judgment of true is made, and stores the memory data in the first cache memory when a judgment of false is made.

According to this structure, since a different cache memory is used according to true or false related to the attribute of data subject for memory access, caches are physically separated by the attribute and heterogeneous caching is realized according to an address. Because there is no case that the data in the first cache memory is replaced with data of the attribute judged to be true, it is possible to improve usage efficiency of the first cache memory.

Here, the attribute of the accessed data is an access address, and the judgment unit may judge whether the access address is within a specific address range or not According to this structure, by corresponding the address range to a memory area, which memorizes data that has a strong spatial locality but have a weak temporal locality, it is possible to hold data that has a strong spatial locality but have a weak temporal locality in the second cache memory. Here, by making the first cache memory have a versatile structure, and the second cache memory have an especially efficient structure for data that has a strong spatial locality but a weak temporal locality, it is possible to improve efficiency of the memory access to the data that has a strong spatial locality but have a weak temporal locality in the second cache memory. Besides, because there is no case that the data in the first cache memory, which is structured to be versatile, is replaced with the data that has a strong spatial locality but a weak temporal locality, it is possible to improve usage efficiency of the first memory. In the way like this, the usage efficiency of the entire cache memory can be improved.

Here, a capacity of the second cache memory may be smaller than a capacity of the first cache memory.

Here, the first cache memory may be a set associative cache memory, and the second cache memory is a full associative cache memory.

Here, the first cache memory may have N1 ways, and each way of the first cache memory may have N2 entries, the second cache memory may have M entries, and M may be smaller than N1 and N2.

Here, M may be 2.

According to this structure, since the capacity of the second cache memory is much smaller when compared with that of the first cache memory, it is possible to improve usage efficiency of the entire cache memory without spending manufacturing cost by adding little hardware.

Here, the holding unit may be accessed by a processor.

According to this structure, the address range may be set programmable by the processor.

Also, for a case when a cache miss occurs, the judgment for whether the data accessed is located in the first cache memory or it is located in the second cache memory can be made with an other attribute of the data. It is not limited to an address of the data.

EFFECTS OF THE INVENTION

With the cache memory in the present invention, it is possible to physically separate the cache by address space, realize heterogeneous caching according to an address, and improve usage efficiency of a first cache memory because data in the first cache memory is not replaced by memory data within the address range mentioned above.

For example, it is possible to improve usage efficiency of the entire cache memory by increasing the usage efficiency of the first cache memory.

Furthermore, the usage efficiency of the entire cache memory can be upgraded by adding little hardware without increasing manufacturing cost.

Also, it is possible to programmatically set up an address range from the processor.

NUMERICAL REFERENCES

Figure 1:
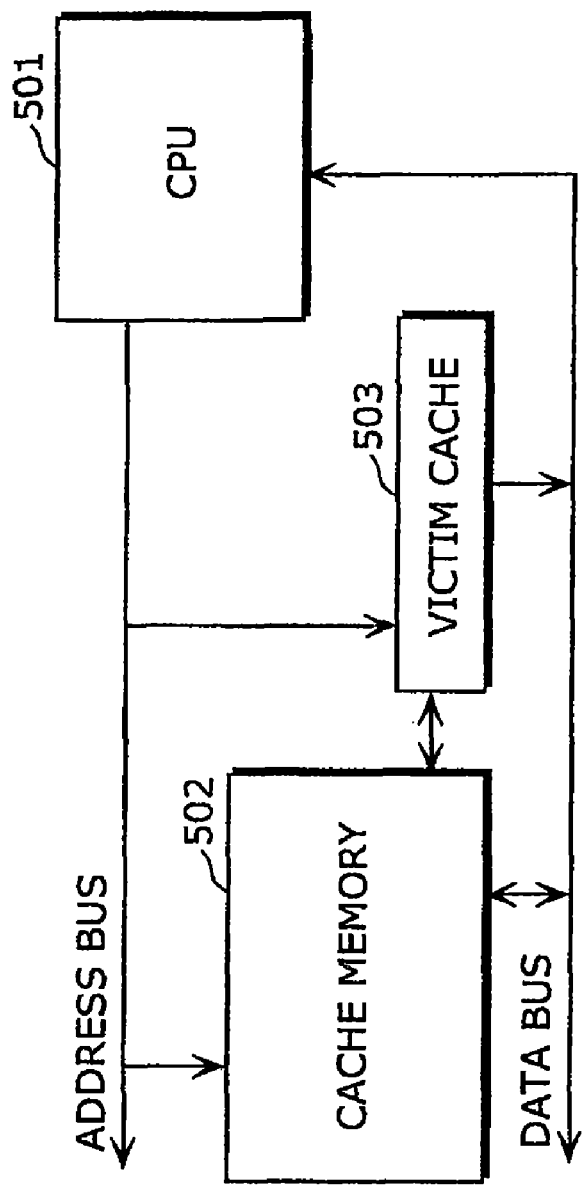
FIG. 1 is a block diagram that shows a system example having a victim cache in conventional technology.

1000 Cache memory
1 Main cache
2 Sub cache
3 Address register
4 Address table
5 Comparator
6 Controlling unit
00 Way
15 Way
0000 Entry
0015a Address entry
0015d Data entry
120 Decoder
150 Comparator
165 Comparator
170 Bus I/F
20 Way
21 Way
200 Entry
200a Address entry
200d Data entry
201a Address entry
201d Data entry

BEST MODE FOR CARRYING OUT THE INVENTION

First Embodiment

Figure 2:
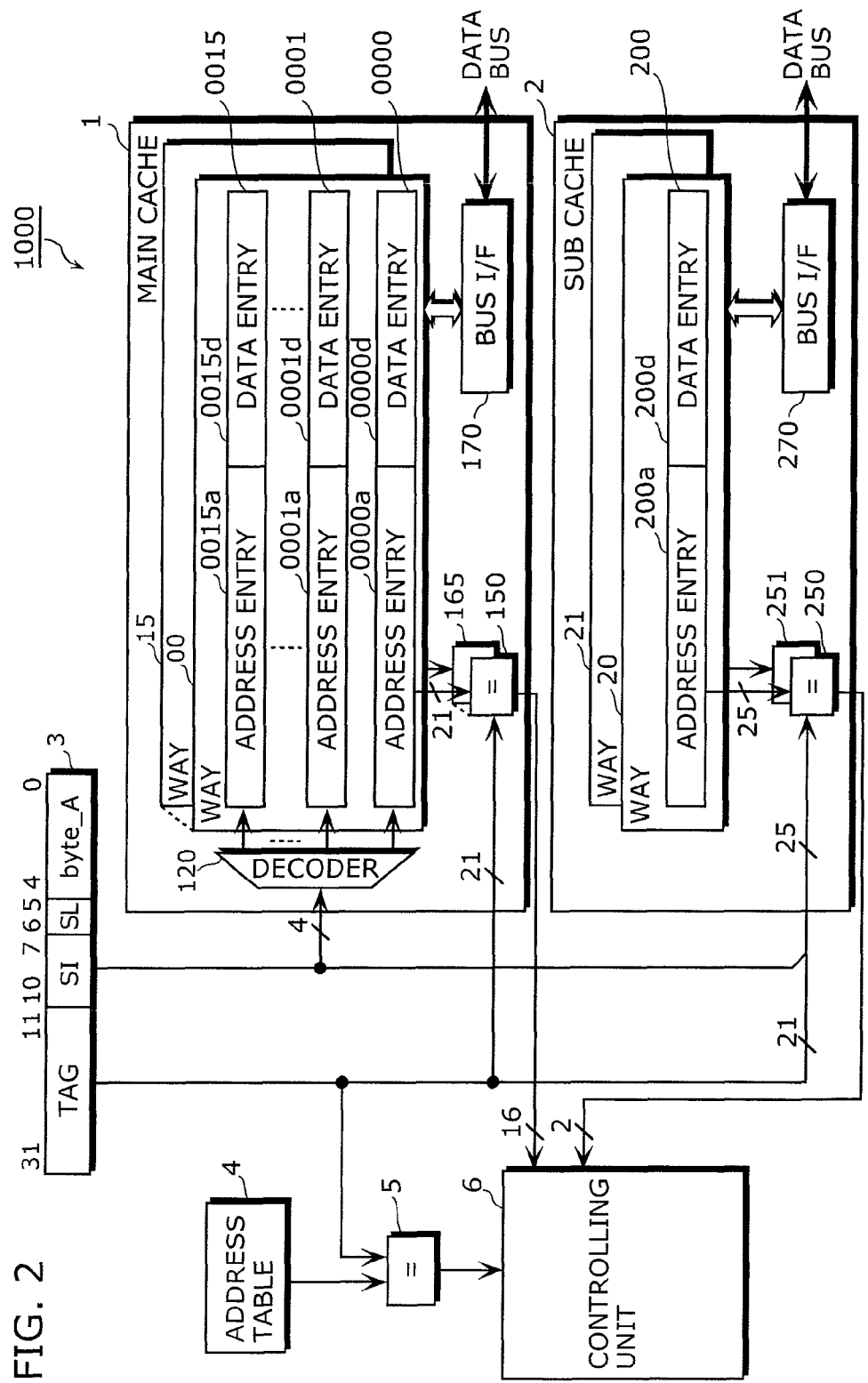
FIG. 2 is a block diagram that shows a configuration of a cache memory in a first embodiment.

FIG. 2 is a block diagram that shows a configuration of a cache system in the first embodiment. A cache memory 1000 as shown in the diagram has a main cache 1, a sub cache 2, an address register 3, the address table 4, the comparator 5 and the controlling unit 6, which is configured in a way that data in a range of addresses set in the address table 4 is cached in a second cache memory, and data outside of the range of the addresses is cached in a first cache memory.

The main cache 1 is a set associative cache memory, which includes sixteen pieces of ways, that are a way 00 to a way 15, the decoder 120, sixteen pieces of comparators, that are a comparator 150 to a comparator 165, and a bus I/F 170. The way 00 has sixteen pieces of entries that are an entry 0000 to an entry 0015. Because the same applies to the way 01 to the way 15 as the way 00, their explanation is omitted.

The entry 0000 has an address entry 0000a for holding a tag address and a data entry 0000d for holding line data. Since the same applies to the entry 0001 to the entry 0015 as the entry 0000, their explanation is omitted.

The decoder 120 decodes a part of a memory access address (called as a set index) held in the address register 3, and respectively selects one entry from each of sixteen pieces of the ways, the way 00 to the way 15. The sixteen pieces of entries consisting of each one selected from each way is called as a set. The sixteen pieces of entries selected output a tag address held in each address entry to the comparators 150 to 165.

The comparator 150 is set to be corresponding to the way 00, compares an effective tag address output from an entry selected by the decoder 120 with a tag output from the address register 3, and outputs a hit signal, which shows there is a hit in the way 00, to the controlling unit 6 if they are matched. Whether the concerned tag address is valid or not is depending on a valid bit output from the concerned entry. In short, only for a case the valid bit shows valid, the comparator 150 outputs a comparison result. The same applies to the comparator 151 to the comparator 165 as the comparator 150 except a point that it respectively corresponds to the way 01 to the way 15, their explanation is omitted.

The bus I/F 170 is an interface to input and output data between data bus and a data entry in an entry hit in a set selected by the decoder 120.

The sub cache 2 is a full associative cache memory, which has a way 20, a way 21, the comparator 250, the comparator 251 and the bus I/F 270.

The way 20 has a single piece of an entry 200. The entry 200 has an address entry 200a for holding a tag address, and a data entry 200d for holding line data. Since the way 21 has the same configuration, its explanation is omitted.

The comparator 250, which is set to correspond to the way 20, compares a valid tag address output from the address entry 200a with an address part (a tag and a set index) output from the address register 3 and, when it is consistent, outputs a hit signal, which shows a hit in the way 20, to the controlling unit 6. Whether the concerned address part is valid or not depends on a valid bit output from the concerned entry. In short, only in the case where the valid bit is valid, the comparator 250 outputs a comparison result. Since the comparator 251 is the same as the comparator 250 except the point corresponding to the way 21, its explanation is omitted.

The address register 3 holds a memory access address output from the processor. Within the example of the same diagram, the address register 3 is 32 bit long. Additionally, it also shows weights of the bits. The tag and the set index (bit 31 to 7) in the address register 3 specify line data in 128 bytes. The set index (bit 10 to 7) specifies one set from sixteen pieces of sets. The sub line address (SL: bit 6, 5) specifies one sub line from four sub lines in the line data. The byte address (byte_A) specifies one byte data in the sub lines.

The address table 4 holds information showing the address range and a sub cache attribute showing whether the sub cache 2 is used or not, and the information showing the address range corresponds to the sub cache attribute showing whether the sub cache 2 is used or not. This information showing the address range is set by the processor, which shows the address range of data that should use the sub cache 2.

The comparator 5 compares information that shows the address range held in the address table 4 with the address part output from the address register 3 when a cache miss occurs in both first cache memory and second cache memory. By doing so, the comparator 5 judges whether the memory access address that is cache miss is within the above address range or not.

In a case where there is a cache miss in the main cache 1 and the sub cache 2, the controlling unit 6 stores memory data in the second cache memory if the memory access address is judged to be within the aforementioned address range by the comparator 5, and the controlling unit 6 stores memory data in the first cache memory if it is judged to be outside of the aforementioned address range by the comparator 5.

Figure 3:
FIG. 3 is an explanatory diagram that shows a configuration of a data entry.

FIG. 3 is an explanatory diagram that shows data structure of data entries in the main cache 1 and the sub cache 2. Each data entry contains line data of 128 byte. One line data is divided into four sub line data, sub line data 1 to sub line data 4. By doing so, it is possible to conduct cache operations such as writing back and replacing based on any of the sub line data unit of the line data unit.

Figure 4:
FIG. 4 is an explanatory diagram that shows a configuration of an address entry within a main cache.

FIG. 4 is an explanatory diagram that shows address entries in the main cache 1. The tag address corresponds to a tag of the address register 3. The valid bits V1 to V4 correspond to the sub line data 1 to 4, which show whether the corresponding sub line data is valid or invalid. Dirty bits D1 to D4 correspond to the sub line data 1 to 4, and show whether there has been a writing into the corresponding sub line data from the processor or not.

An LRU bit L shows an accessing order of 16 pieces of entries within the set from the processor. In order to accurately express the accessing order from number 1 to number 16, it normally needs at least 4 bits, but here the LRU bit, which is one bit, expresses an accessing order of the two: the number one (new) and the number two (old) by each entry in the set. One of the entries having the LRU bit L as the number two (old) is selected as a subject for replacement.

A weak bit W shows whether one of the 16 pieces of entries in the set can be replaced immediately or not. In other words, it is a bit to an entry having its weak bit W as 1 (the oldest) is selected as a subject for replacement regardless of its LRU bit. forcibly make the accessing order be oldest.

Figure 5:
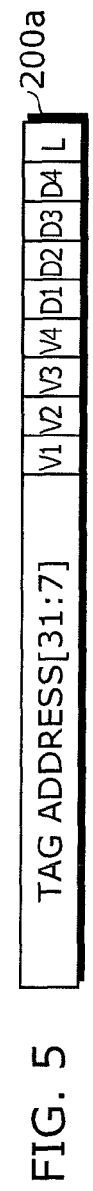
FIG. 5 is an explanatory diagram that shows a configuration of an address entry within a sub cache.

FIG. 5 is an explanatory diagram that shows a structure of address entries in the sub cache 2. The tag address corresponds to bits 31 to 7 (a tag and a set index) of the address register 3. Since valid bits V1 to V4, dirty bits D1 to D4 and an LRU bit L are the same as those in the FIG. 4, their explanation is omitted.

Figure 6:
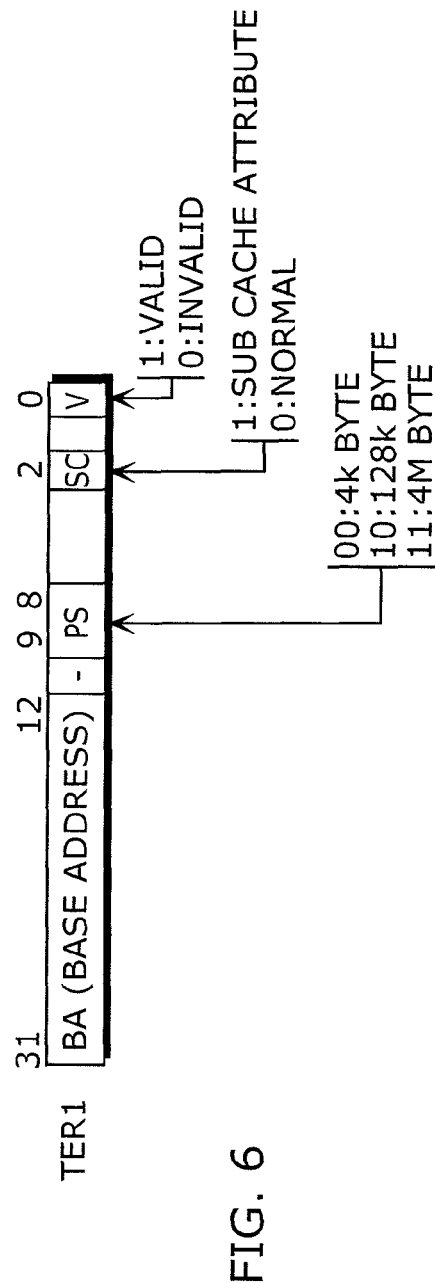
FIG. 6 is an explanatory diagram that shows a configuration of an address entry on an address table.

FIG. 6 is an explanatory diagram that shows a structure of a table entry register contained in the address table 4. The address table 4 has at least one table entry register. A table entry register TER1 in the same diagram holds a base address BA, a page size PS, a sub cache attribute SC and a valid bit V. The base address BA indicates a head of the address range. The page size PS shows size of the concerned address range (size of the memory area). In the example of the same diagram, size of the address range is 4 k byte if PS=00, 128 k byte if PS=10 and 4M byte if PS=11. The sub cache attribute SC shows whether the memory data corresponding to the concerned address range is allocated to the sub cache 2 or not. The valid bit indicates whether the table entry register TER1 is valid or not. It is possible for the table entry register to directly read out and write in from the processor.

Figures 7, 8:
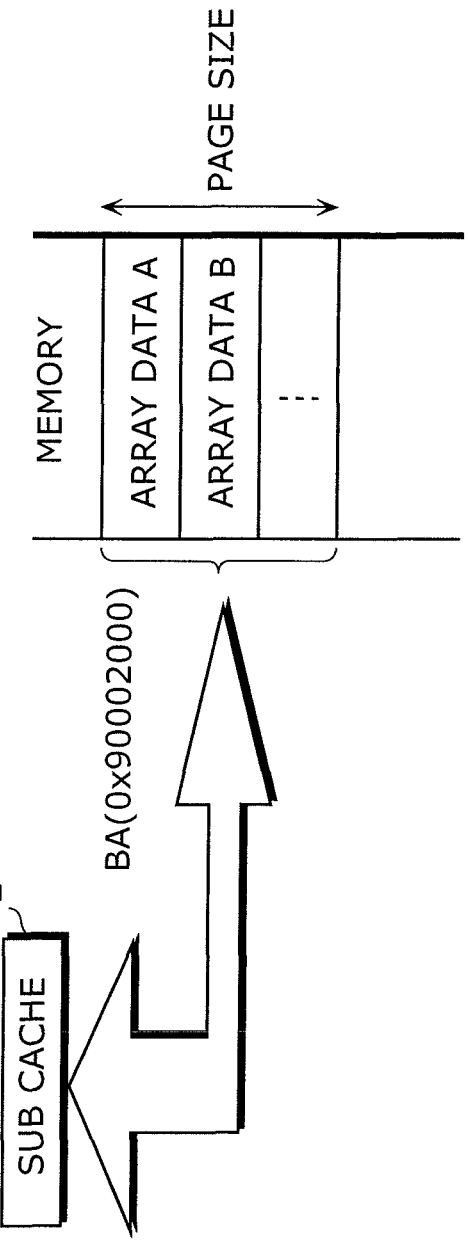
FIG. 7 is an explanatory diagram that shows a program example for setting up a table entry register.
FIG. 8 is an explanatory diagram that shows a relationship between a memory area where a sub cache attribute is set up and a sub cache 2.

FIG. 7 is an explanatory diagram that shows a program example for setting up the table entry register TER1 in the address table 4. In the same diagram, "equ" in the first and second lines are a pseudo instruction for an assembler to define a variable number. Anything after "//" in each line means to be a comment. In the first line, an address of the table entry register TER1 is defined as a value of the variable ADR_TER1. In the second line, data (0x90002205) that should be set in the table entry register TER1 is defined as a value of the variable number DAT_TER1. In this example, the base address BA mean to be an address of 0x90002000, the page size PS means to be 10 (128 k byte), the sub cache attribute SC means to be 1 (allocated to the sub cache), and the valid bit V means to be 1 (valid). A mov instruction in the sixth line is an instruction to transfer a value of the variable ADR_TER1 to a register r28. A mov instruction in the seventh line is an instruction to transfer a value of the variable number DAT_TER1 to a register r29. An st instruction in the eighth line is an instruction to write contents of the register r28 as an address for data of the register r29. By doing so, a value of the variable DAT_TER1 is set in the table entry register TER1.

FIG. 8 is an explanatory diagram that shows a relationship between a memory area where sub cache attributes are set and the sub cache 2. This diagram indicates a memory area allocated to a sub cache by the program example of the FIG. 7. In short, memory data in the memory area, of which data size is from the base address BA (Address 0x90002000) to the page size PS (128 k byte), is cached into the sub cache 2, not the main cache 1. This memory area is suitable to store data, for example, array data A and B, which has a strong spatial locality and a weak temporal locality. Also, memory data in an area other than this memory area is cached into the main cache 1.

Furthermore, it is obvious that this is suitable to store data, which has strong temporal locality, of which access is intensively concentrated in an extremely short period of time, and which is also closed in a small area (for example, of which size is the same as or smaller than a line or is the same as or smaller than the sub cache 2).

Figure 9:
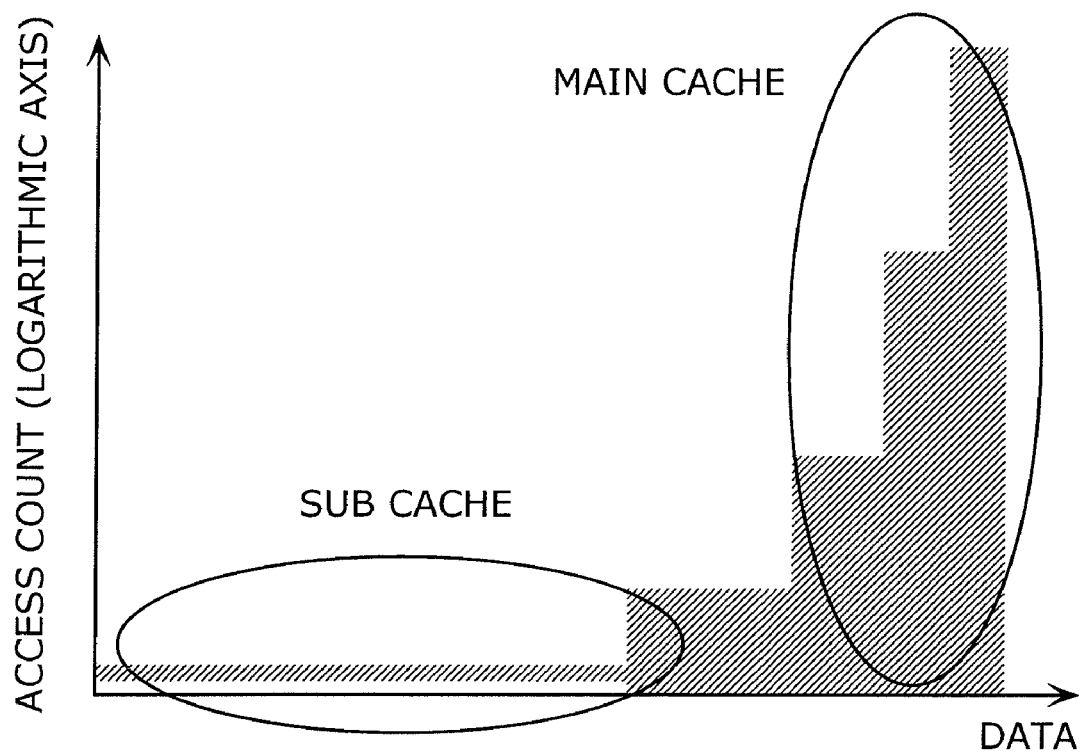
FIG. 9 is a diagram that shows an example of patterns indicating a correspondence relationship of a memory accessing count for each data.

FIG. 9 is a diagram that shows an example pattern of a memory access count for each data. In this diagram, for example, the access count of each data in a process of compression and expansion for moving images. In this case, it can tell that data having less access count widely exists, and on the other hand, that many accesses tend to be concentrated on less data. Therefore, using this trend, for example, by allocating an area of data, which has less access count but widely exists, into the sub cache 2, and allocating an area of data, which has more access count and can fit into the size of the main cache 1, into the main cache 1, it is possible to use the main cache 1 and the sub cache 2 efficiently.

Figure 10:
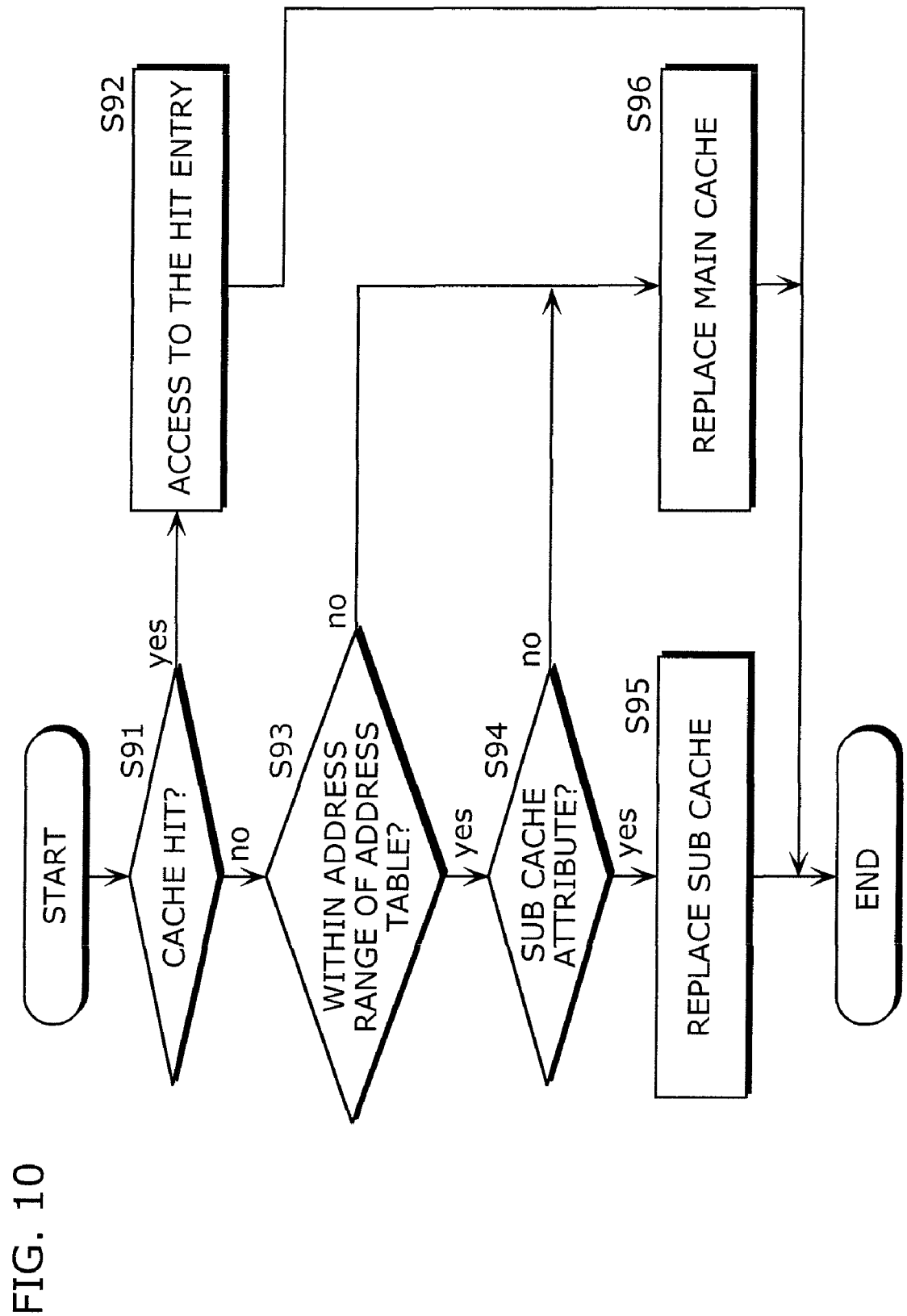
FIG. 10 is a flow chart that shows operations of the cache memory through control of a controlling unit 6 when a processor accesses a memory.

FIG. 10 is a flow chart that shows operations of the cache memory through a control of the controlling unit 6 when the processor accesses the memory. In the same diagram, when there is a hit in the memory access, in other words, when a tag of the address register 3 holding a memory access address matches with any of the tag addresses held in the main cache 1 or the sub cache 2 (S91: yes), the controlling unit 6 either reads or writes the concerned hit entry (S92).

When the memory access results in a cache miss, and if the memory access address is within a range of the addresses indicated in the address table 4 (S93: yes) and if the concerned address range is allocated to the sub cache (S94: yes), an entry in the sub cache 2 is replaced and the concerned entry is accessed (S95). Also, if the memory access address is outside of the address range shown in the address table 4 (S93: no) or if the concerned address range is not allocated to the sub cache (S94: no), then an entry of the main cache 1 is replaced and the concerned entry is accessed (S95).

As has been explained above, according to the cache memory in the present embodiment, because a different cache memory is used depending on a case whether the memory data is data within the address range set in the address table 4 or not, the cache is physically separated by address space and heterogeneous caching is realized based on the address. Because there is no case that the data in the main cache 1 is replaced by the memory data within the aforementioned address range, it is possible to improve usage efficiency of the main cache 1.

For example, by corresponding the address range set in the address table 4 to the memory area that memorizes data having a strong spatial locality but a weak temporal locality, data having a strong spatial locality but a weak temporal locality is stored in the sub cache 2, and any data other than that is stored in the main cache 1. As a result of that, it is possible to improve memory accessing efficiency for the data having a strong spatial locality but a weak temporal locality. In addition, there is no case that the data in the main cache 1 is replaced with the data having a strong spatial locality but a weak temporal locality so that it is possible to improve usage efficiency of the first cache memory. In a way like this, it is possible to enhance usage efficiency of the entire cache memory.

Also, compared with capacity of the main cache 1, capacity of the sub cache 2 may be very small so that it is possible to improve usage efficiency of the entire cache memory just by adding little hardware without adding manufacturing cost.

Moreover, since the address table 4 can be set programmatically by the processor, it is possible to use the main cache 1 and the sub cache 2 flexibly by each application or by each task.

By the way, the address table 4 does not need to be programmable. So it is obvious that it may be allocated statically.

The following explains about variant examples of the cache memories in the first embodiment.

Although the example explains a case that the main cache 1 is a set associative cache memory of 16 ways, it may be a set associative cache memory of n ways (n is something other than 16). Also, the example is explained for a case having 16 entries per way, but it may have m pieces of entries (m is something other than 16).

The number of entries for the sub cache 2 may be 2 pieces. In order to suppress an increase in the hardware magnitude and also suppress an increase in the hardware cost, the number of entries for the sub cache 2 may be kept from a single piece to a few pieces.

For the main cache 1, the example of the set associative cache memory was explained, but it may be a full associative cache memory or a direct map cache memory.

The sub cache 2 may be a direct map cache memory or a set associative cache memory.

In addition, the victim cache shown in the FIG. 1 may be added to the main cache 1. Also, the victim cache shown in the FIG. 1 may be added to the sub cache 2.

Second Embodiment

In this embodiment, a structure that has two sub caches is explained.

Figure 11:
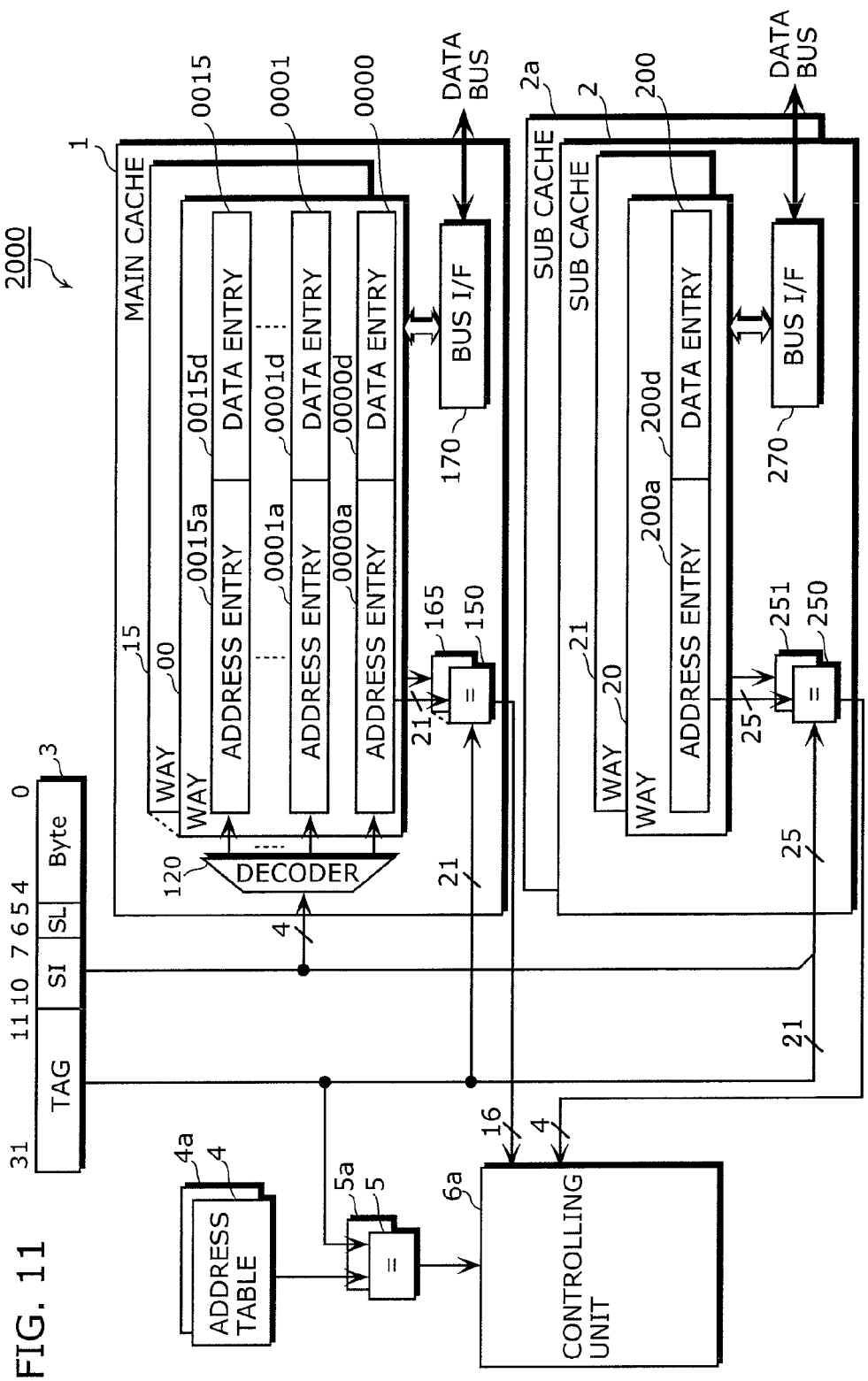
FIG. 11 is a block diagram that shows a configuration of a cache memory in a second embodiment.

FIG. 11 is a block diagram that shows a structure of the cache memory in the second embodiment. In terms of the cache memory 2000 in this diagram, if compared with the cache memory 100 shown in the FIG. 2, differences are that the sub cache 2a, the address table 4a and the comparator 5a are newly added and that a controlling unit 6a is provided in stead of the controlling unit 6. Explanation for those same as ones in the FIG. 2 is omitted, and the following explains mainly on those that are different.

The sub cache 2a is a full associative cache memory, which is the same as the one of the sub cache 2.

The address table 4a holds an address range that indicates a memory area allocated to a sub cache 2a.

A comparator 5a judges whether a tag of the address register 3 is included within the address range held in the address table 4a or not.

The controlling unit 6a controls the sub cache 2a in addition to functions of the controlling unit 6. The sub cache 2a may be operated at the same time as the sub cache 2, or it may be operated alternatively according to an application or a task.

In the way like this, according to the cache memory 2000 in the present embodiment, it is possible to operate a plural number of sub caches simultaneously or alternatively, to use flexibly according to an application or a task, and to improve usage efficiency of the cache memory 2000.

By the way, the variant example that was explained in the first embodiment may also be applied to the present embodiment.

INDUSTRIAL APPLICABILITY

The present invention is suitable to a cache memory for speeding up memory accesses, and is suitable to, for example, an on-chip cache memory, an off-chip cache memory, a data cache memory, an instruction cache memory, and so on.

The invention claimed is:

1. A data processing system, comprising:
   a processor
   a first cache memory,
   a second cache memory that is operated in parallel with said first cache memory and physically separated from said first cache memory by an address range,
   a comparator operable, when a cache miss occurs in both said first cache memory and said second cache memory, to make one of a true judgment and a false judgment relating to an access address of memory data for which memory access resulted in the cache misses, and
   a controller operable to store the memory data in said second cache memory when the true judgment is made, and store the memory data in said first cache memory when the false judgment is made,
   wherein said processor accesses a data entry in said first cache memory when there is a cache hit in said first cache memory, and accesses a data entry in said second cache memory without any data transfer between said first cache memory and said second cache memory when there is a cache hit in said second cache memory, wherein
   there is no case in which the memory data of the access address judged to be true and stored in said second cache memory is stored in said first cache memory for physically separating said second cache memory from said first cache memory by the address range.

2. The data processing system according to claim 1, wherein said comparator is operable to judge whether the access address is within a specific address range.

3. The data processing system according to claim 2, further comprising:
   a holding register operable to hold the specific address range.

4. The data processing system according to claim 3, wherein said holding register is written into by said processor executing an instruction for storing a value in said holding register.

5. The data processing system according to claim 1, wherein a capacity of said second cache memory is smaller than a capacity of said first cache memory.

6. The data processing system according to claim 5, wherein said first cache memory is a set associative cache memory, and
   said second cache memory is a full associative cache memory.

7. The data processing system according to claim 5, wherein said first cache memory has N1 ways, and each way of said first cache memory has N2 entries,
   said second cache memory has M entries, and
   M is smaller than N1 and N2.

8. The data processing system according to claim 7, wherein M is 2.

9. The data processing system according to claim 3, wherein said first cache memory is a set associative cache memory, and
   said second cache memory is a full associative cache memory.

10. The data processing system according to claim 3, wherein a capacity of said second cache memory is smaller than a capacity of said first cache memory.

11. The data processing system according to claim 10, wherein said first cache memory is a set associative cache memory, and
    said second cache memory is a full associative cache memory.

12. The data processing system according to claim 10, wherein said first cache memory has N1 ways, and each way of said first cache memory has N2 entries,
    said second cache memory has M entries, and
    M is smaller than N1 and N2.

13. The data processing system according to claim 12, wherein M is 2.

14. The data processing system according to claim 13, wherein said holding register is accessed by said processor.

* * * * *